July 3, 1951
C. S. MAXWELL ET AL
2,559,221
MANUFACTURE OF WET STRENGTH PAPER
Filed June 28, 1947
3 Sheets—Sheet 1
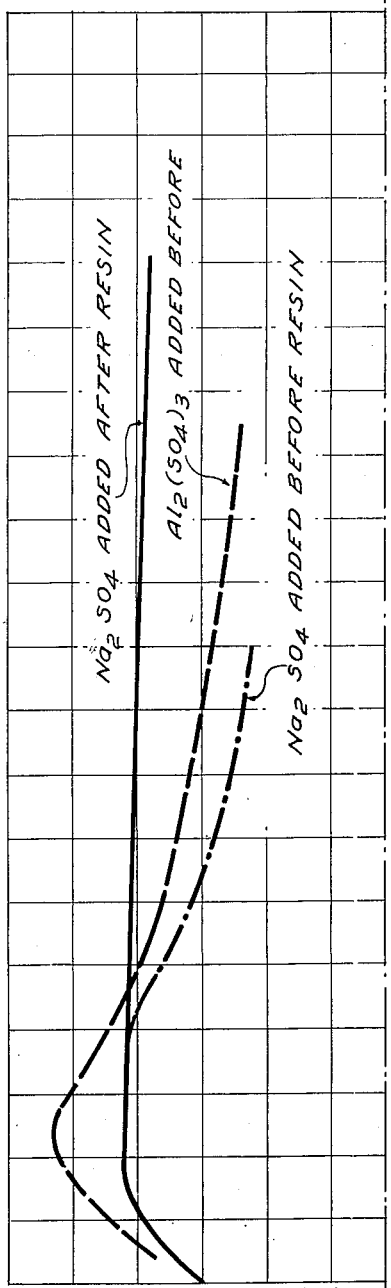
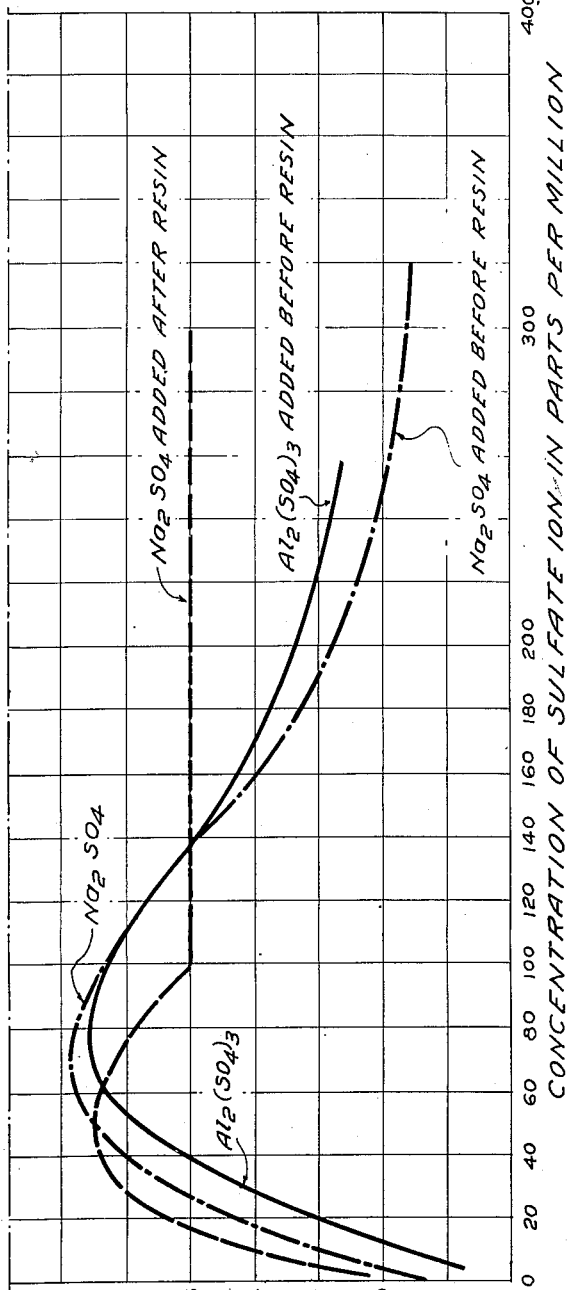
Fig. 1.
INVENTORS
CHARLES S. MAXWELL,
CHESTER G. LANDES,
BY
Wm. P. Spielman
ATTORNEY July 3, 1951  C. S. MAXWELL ET AL  2,559,221

MANUFACTURE OF WET STRENGTH PAPER

Filed June 28, 1947  3 Sheets-Sheet 3

INVENTORS
CHARLES S. MAXWELL,
CHESTER G. LANDES,
BY
Wm. P. Spielman
ATTORNEY

Patented July 3, 1951

2,559,221

UNITED STATES PATENT OFFICE 2,559,221

MANUFACTURE OF WET STRENGTH PAPER

Charles S. Maxwell, Old Greenwich, and Chester G. Landes, New Canaan, Conn., assignors to American Cyanamid Company, New York, N. Y., a corporation of Maine Application June 28, 1947, Serial No. 757,750

5 Claims. (Cl. 92—21)

This invention relates to a process for the manufacture of wet strength paper by the treatment of aqueous suspensions of cellulosic papermaking fibers with a colloidal solution of cationic melamine-formaldehyde resin, followed by forming the treated fibers into a felted product and heating the felted product to cure the melamine-formaldehyde resin.

In our copending application Serial No. 453,032, filed July 31, 1942, we have described and claimed the so-called "beater-addition" process which has since been widely adopted for the manufacture of wet strength paper. The essential features of this process are the addition to a water suspension of paper stock such as kraft stock, rag, soda, sulfate, sulfite or ground wood stock of a colloidal solution of cationic melamine-formaldehyde resin having the property of selectively absorbing or adsorbing on the cellulosic fibers, so that substantial amounts of resin sufficient to impart improved wet strength are applied to the fibers from a relatively dilute resin solution, followed by forming the treated fibers into a felted sheet, or other form of product, and heating this product by passing it over steam-heated drying rolls.

The colloidal solutions of cationic melamine-formaldehyde resin used in practicing the above-described process are described and claimed in U. S. Patent No. 2,345,543. They are prepared by dissolving an ordinary unpolymerized or partially polymerized but acid-soluble melamine-formaldehyde condensation product in water acidified with sufficient acid other than sulfuric acid to produce a pH of about 0.5 to about 4.0 when measured in a 15% aqueous solution of the melamine-formaldehyde resin, followed by aging these acidified solutions to convert the resin into the colloidal, cationic condition. In this condition a positive electrical charge is attached to the colloidally dispersed resin particles, and the resin therefore possesses definite cationic properties and can be selectively adsorbed from solutions by cellulose and by fibers of cellulosic material which bear a negative electrical charge. The terminology "cationic melamine-formaldehyde resin" designates a positively charged melamine resin having the property of being selectively adsorbed by negatively charged cellulosic material, and the term "colloidal solution of cationic melamine-formaldehyde resin" is used to define a colloidal solution of such a resin; i. e., one in which the resin particles are of a size within the colloidal range.

In our copending application referred to above we have shown that suitable amounts of a colloidal solution of cationic melamine-aldehyde resin containing 5–20% of resin solids or more may be added to the stock suspension in the beater or stock chest of a paper mill, and that this addition may be made along with the addition of clay, aluminum sulfate, rosin size, talc and other loading materials if desired. The resin can also be added with success to stock flowing to or from refining machines such as the Jordan engine or in a headbox of a Fourdrinier paper machine. The amount of cationic melamine-formaldehyde resin to be applied to the cellulosic fibers is dependent upon the type of stock and the degree of wet strength and wet-rub and fold resistance desired. Even small amounts on the order of a few tenths of 1%, based on the dry weight of the fiber, will produce a definite improvement in these characteristics with some stocks, including those which have been sized in the beater with rosin size and alum. Amounts on the order of 0.5–1% are quite effective in some cases, but for most purposes we recommended amounts of 2–4% of the dry weight of the fibrous cellulosic material, the preferred average figure being about 2–3%.

In our earlier application we also pointed out the very surprising fact that substantially all of the acid, used to convert the resin to the colloidal, cationic condition, is released from the resin when the resin is adsorbed on the cellulosic paper stock; the acid is removed with the white water and therefore does not remain in the paper or other cellulosic products to cause tendering or brittleness on aging. After the treated stock has been formed on a papermaking or wet molding machine it is dried in the usual manner as by passing the paper over heated drums, which may be heated with steam at the usual paper mill drying temperatures of, for example, 200–300° F., whereby products are obtained which not only possess a high degree of wet strength, but which also possess improved folding endurance, this being a characteristic that is not found in wet strength paper prepared by impregnating finished paper into a resin solution.

Our present invention is directed to improvements in the above-described process of our earlier application, which improvements relate particularly to the control of the concentration of sulfate ion in the slush stock system of the papermaking process; i. e., in the preparation and treatment of the stock prior to the forming step. We have found that a substantial increase in the retention of the colloidal cationic melamine-formaldehyde resin, with a corresponding increase in the wet tensile strength of the paper, can be obtained upon adding about 0.5% to 10% of the resin by controlling the concentration of dissolved sulfate ion in the water within the range of about 40–50 to 150 parts per million parts of water. The results obtained by controlling the sulfate ion concentration in this manner, and the operating improvements obtainable with these results, constitutes the important technical advances which form the additional subject matter of our present application.

We have found that the retention of the colloidal, cationic melamine-formaldehyde resin by cellulosic papermaking fibers in aqueous suspension is profoundly affected by the presence of small but definite quantities of sulfate ion dissolved in the water in which the paper stock is suspended. Tests made with kraft paper stock beaten and diluted to varying consistencies in deionized water and treated with varying quantities of a colloidal cationic melamine-formaldehyde-hydrochloric acid solution have shown that in the absence of dissolved sulfate ion the amount of resin retention is a function of the stock consistency; i. e., at relatively low consistencies on the order of 0.6% fiber concentration only about 1% of resin, based on the dry weight of the fiber, is retained when 3% of the resin is added to the stock whereas at higher stock consistencies the retention is greater. However, the addition of a water-soluble sulfate such as sodium sulfate or aluminum sulfate to the process water in amounts corresponding to about 50 to 150 parts per million of sulfate ion diminishes this effect of stock consistency and increases the resin retention, particularly at the consistencies (0.2% to 1%) used in most paper mills.

Our investigations have also shown that the adverse effects of large concentrations (more than 200 parts per million) of sulfate ion on the retention and wet strength obtained with the colloidal cationic melamine resin can be diminished by absorbing the resin on the finely divided paper pulp at relatively high stock consistencies on the order of 2–6% or more, and this is another important advantage of our invention.

We have also found advantages in the presence of definite quantities of sulfate ion on the order of 50–150 parts per million in the water used to suspend the paper stock when relatively large quantities of the colloidal cationic melamine-formaldehyde resin on the order of 5% to 10%, based on the dry weight of the paper stock, are used. In our above-entitled application we called attention to an apparent "saturation" of the fiber when 3–4% of the rein had been adsorbed, and stated that the same quantity of resin is picked up whether 5% or 10%, based on the fiber weight, is added. We now find, however, that the quantity of cationic resin retained by the papermaking fibers increases directly with the increased quantities of added resin up to a resin content on the order of 6–7% when 10% of resin, based on the dry weight of the fiber, is added, when the water in which these fibers are suspended contains about 50 to 150 parts per million of sulfate ion. This discovery is of particular advantage in the production of wet molded cellulosic products such as plates, spoons and the like where a higher content of curable melamine-formaldehyde resin may be desirable than is ordinarily needed for improved wet strength.

The invention will be further described with reference to the accompanying drawings in which:

Fig. 1 is a graph showing the effect of increasing quantities of dissolved sulfates on the retention of the colloidal cationic resin by the paper stock and on the wet tensile strength of the paper after forming and heating to cure the resin to a water-insoluble condition.

Figure 3:
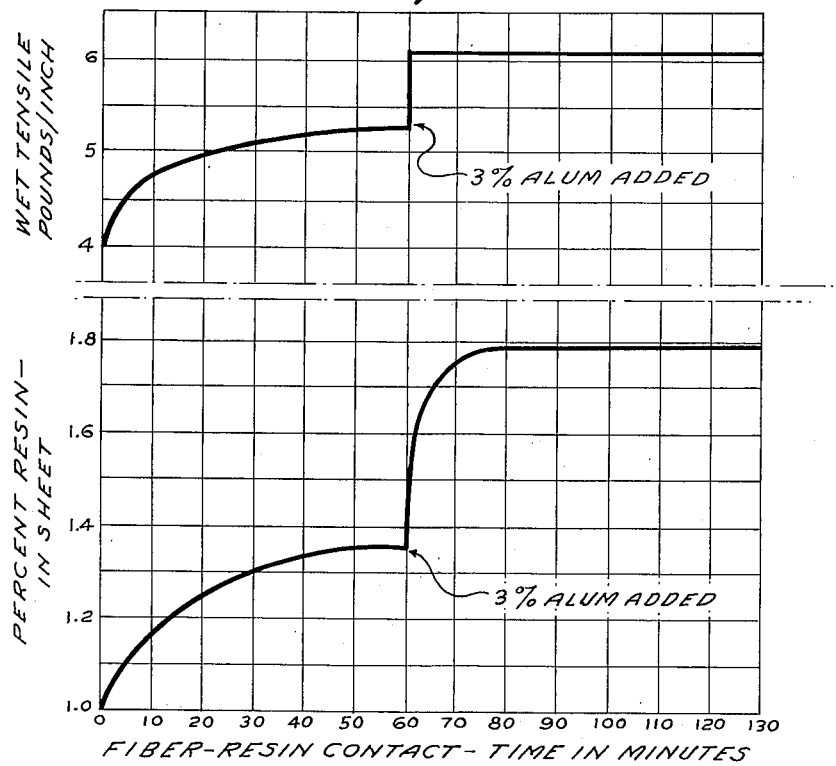
Figure 4:
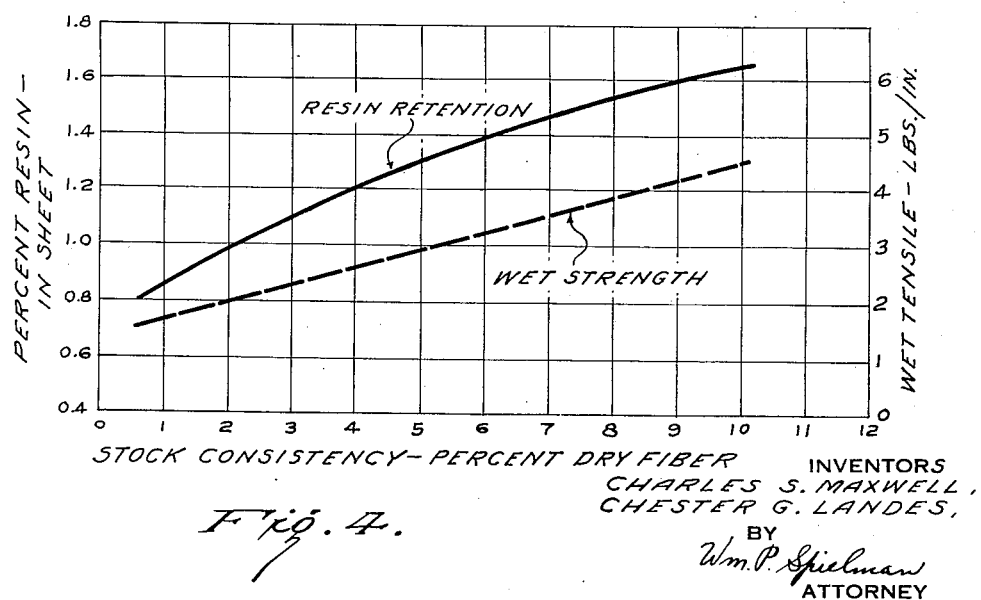

Fig. 3 is a graphical illustration of the immediate increase in resin retention and wet tensile strength that takes place upon the addition of sulfate ion to the aqueous cellulosic fiber-colloidal melamine resin suspension, and Fig. 4 shows the extent of the increase of resin retention and wet strength with increasing stock consistencies in the presence of large quantities of dissolved sulfate ion on the order of 400 parts per million.

Figure 2:
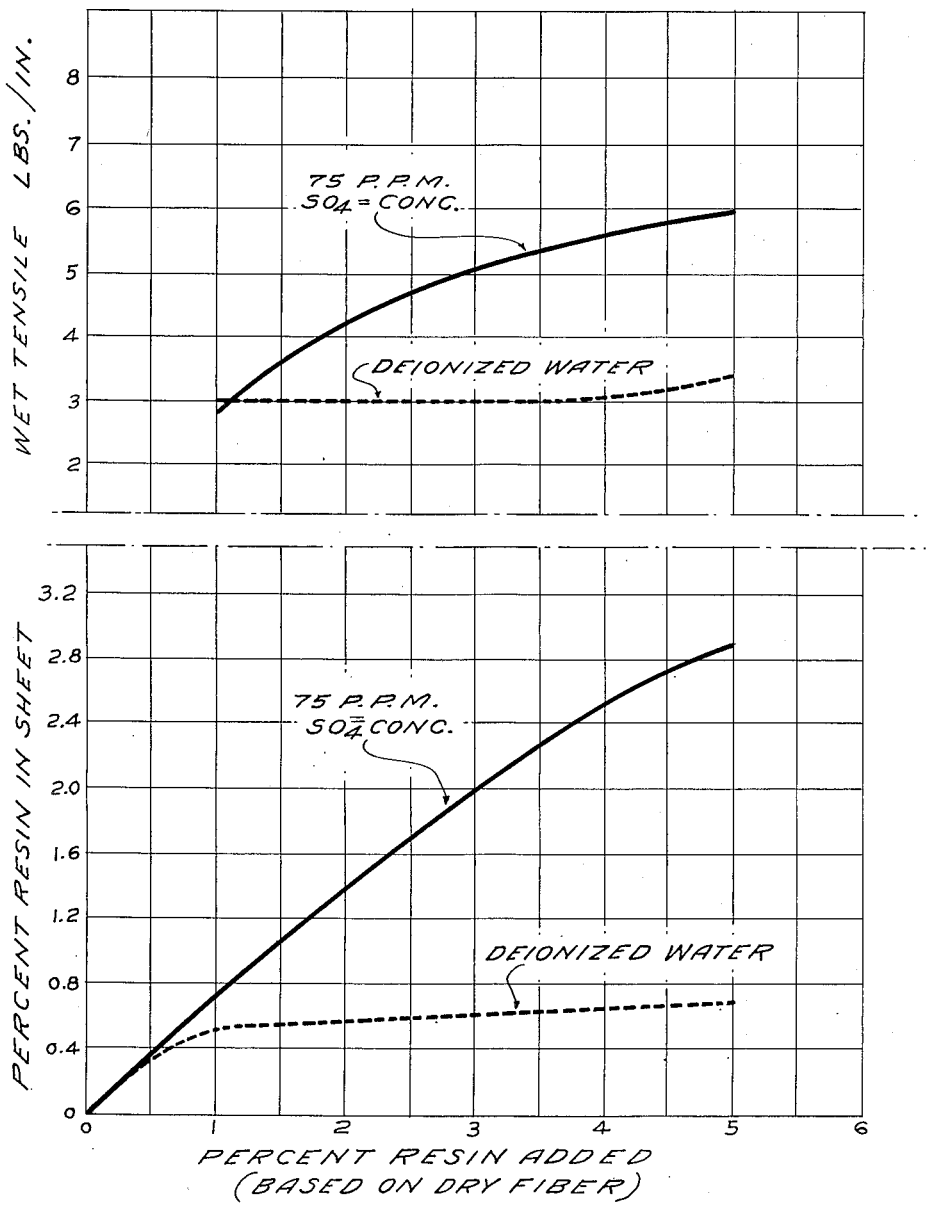
Fig. 2 is a similar graph showing the increase of resin retention and of wet tensile strength with the addition of increasing quantities of the cationic melamine-formaldehyde resin when kraft stock is suspended in water containing 75 parts per million of sulfate ion.

In obtaining the results shown in Figs. 1, 3 and 4 the quantity of cationic melamine-formaldehyde resin used was 3%, based on the dry weight of the fiber, which was bleached kraft fiber. In Figs. 1, 2 and 3 the stock consistency was 0.6%. In Fig. 3, "alum" means $Al_2(SO_4)_3$ combined with about 14 mols of $H_2O$, which is also known as papermaker's alum. In all cases the cationic melamine resin solution was prepared by the following procedure:

A spray-dried melamine-formaldehyde resin containing about 3 mols of combined formaldehyde for each mol of melamine was used. This resin was added with stirring to water which had previously been acidified with 0.8 mol of hydrochloric acid for each mol of melamine and heated to 140° F., the amounts of resin and acidified water corresponding to 12 pounds of resin per gallon. The resulting clear solution was allowed to stand and cool to room temperature and was aged for a total of at least 8 hours, usually overnight. This resulted in the formation of a colloidal solution of cationic melamine-formaldehyde resin.

The results shown on Fig. 1 of the drawings were obtained by preparing a series of handsheets from kraft paper stock beaten with deionized water. Varying quantities of sodium sulfate or aluminum sulfate were added to samples of the beaten pulp suspension, which were then treated with the cationic melamine-formaldehyde resin, formed into paper, and dried 1 minute at 240° F. With the exception of the pH of the resin-treated stock, all the other known variables were held constant.

In order to show the effect of adding sulfate ion to the paper stock after adding the colloidal soltuion of cationic melamine-formaldehyde resin one series of handsheet batches was prepared in which the sulfate ion, varying in concentration from 0 to 400 parts per million, was added after the resin. Reference to Fig. 1 will show that the retention vs. sulfate concentration curves representing the two different orders of addition coincide very closely up to a sulfate ion concentration of 50–60 parts per million, but that no substantial decrease in resin retention or in wet tensile strength occurs when the sulfate ion concentration is higher than 100 parts per million. These facts emphasize the desirability of adding the cationic melamine-formaldehyde resin to suspensions of the paper stock in water of optimum (50-150 P. P. M.) sulfate ion concentration followed by further dilution of the stock with ordinary plant water of higher sulfate ion concentration when applying the process in paper mills supplied with water having a sulfate ion content substantially in excess of 150 P. P. M.

The results shown in Fig. 2 were obtained by preparing a series of handsheets from beaten kraft paper stock with deionized water, varying the amount of cationic melamine-formaldehyde resin added from 0.5% to 5% on the dry weight of the fiber, with and without the addition of 75 parts per million of sulfate ion, based on the weight of the water. This particular concentration of sulfate ion was used because it had been found, from the results shown in Fig. 1, that the maximum retention of 3% of the melamine resin was obtained at this concentration. The curves show clearly the increase in resin retention and in wet tensile strength that is obtained by adding the sulfate ion.

Fig. 3 of the drawings illustrates in greater detail the effect referred to in discussing Fig. 1; namely, the immediate increase in resin retention and wet strength that can be obtained by the addition of optimum quantities of sulfate ion after the cationic melamine-formaldehyde resin has been added to the paper stock suspension. In preparing this series of handsheets the kraft fiber was beaten in deionized water and diluted with deionized water to 0.6% consistency and 3% of the cationic melamine-formaldehyde resin was added, based on the dry weight of the fiber. Samples of the fiber were taken at intervals after the resin addition and made into handsheets, and 3% of alum (based on the dry weight of the fiber and corresponding to about 70 parts per million of sulfate ion) was added after the remainder of the resin-treated stock had been standing for 60 minutes. Additional samples were then taken periodically and made into handsheets, and all of the handsheets were analyzed for resin content and for wet tensile strength. The substantial increase in both resin retention and wet strength is evident from the drawing.

Fig. 4 of the drawings shows the effect of variations in the stock consistency in the presence of large quantities of dissolved sulfate ion. The results shown in this figure were obtained by treating with cationic melamine-formaldehyde resin a number of batches of beaten bleached kraft stock at consistencies ranging from 0.6% to 10% while maintaining a sulfate ion concentration of 400 parts per million in the stock suspension prior to the addition of the resin. The fiber-resin contact time was held constant at one hour, after which the stock consistency was adjusted to 0.6%, and the fiber was made into handsheets which were heated 1 minute at 240° F. to cure the resin and were then tested for resin content and wet tensile strength.

The improvements obtainable by applying our discoveries in the commercial manufacture of cellulosic products containing melamine-aldehyde resins are evident from the facts outlined above. In manufacturing wet strength paper and other wet molded cellulosic products in soft water districts where the water used by the mill contains considerably less than 40-50 parts per million of dissolved sulfate ion, the addition of a water-soluble sulfate such as sodium sulfate or ammonium sulfate is indicated. On the other hand, mills located in hard water districts where the water contains substantially more than 150 parts per million of dissolved sulfate ion should either employ partially deionized water, in order to maintain the sulfate content within the range of 50-150 parts per million, or should add the colloidal cationic melamine-aldehyde resin to the paper stock when the latter is dispersed in water containing more than 200 parts per million of dissolved sulfate ion at relatively high consistencies on the order of 3-6% or greater.

Similarly, paper mills in soft water districts employing alum or other sulfates in their papermaking processes should add the colloidal cationic melamine-aldehyde resin at a point in the stock treatment after the alum or other sulfate has been added, in order to take advantage of the sulfate content thereof and thus increase the sulfate ion content of the water to a concentration within the range of about 50-150 parts per million. On the other hand, mills using water containing substantially more than 100 parts per million of dissolved sulfate should add the cationic melamine resin solutions to the aqueous paper stock suspensions before adding alum or other sulfate-containing sizing or stock-treating materials. The advantage of this method of operation is demonstrated by the curves on Fig. 1 of the drawings.

What we claim is:

1. A method for the production of paper of improved wet strength which comprises preparing a suspension of cellulosic fibers in water containing from about 50 to about 150 parts per million of dissolved sulfate ion, adding to said suspension a colloidal solution of cationic melamine-formaldehyde resin, adsorbing substantial quantities of said resin on the cellulosic fibers, forming the treated fibers into paper, and heating the paper to dry it and to cure the melamine-formaldehyde resin therein.

2. A method for the production of cellulosic products of improved wet strength which comprises producing a suspension of cellulosic fibers in water containing from 50 to 150 parts per million of dissolved sulfate ion at a consistency substantially higher than that desired for use in forming the product, adding to said suspension a quantity of a colloidal solution of cationic melamine-formaldehyde resin containing from 0.5% to 10% of said resin, based on the dry weight of said cellulosic fibers, adsorbing substantial quantities of said resin on the fibers, adding water containing more than 150 parts per million of dissolved sulfate ion to the treated suspension in quantities sufficient to dilute it to the desired forming consistency, forming the treated fibers into a felted product, and heating the felted product to cure the melamine-aldehyde resin therein.

3. A method for the production of cellulosic products of improved wet strength which comprises producing a suspension of cellulosic fibers in water containing more than 150 parts per million of dissolved sulfate ion at a consistency of at least 2%, adding a colloidal solution of cationic melamine-formaldehyde resin to said suspension in amounts of 0.5% to 10% of melamine resin based on the dry weight of the fibers, adsorbing substantial quantities of said resin on the fibers, diluting the suspension to papermaking consistencies by adding water containing more than 150 parts per million of dissolved sulfate ion, forming the treated fibers into a felted product, and heating the felted product to cure the melamine-aldehyde resin.

4. A method for the production of cellulosic products of improved wet strength which comprises producing a suspension of cellulosic fibers in water containing more than 100 parts per million of dissolved sulfate ion, adding a colloidal solution of cationic melamine-formaldehyde resin to said suspension in amounts of 0.5% to 10% of melamine resin based on the dry weight of the fibers, adsorbing substantial quantities of said resin on the fibers, adding alum to said suspension in quantities sufficient to increase substantially the content of dissolved sulfate ion therein, forming the treated fibers into a felted product and heating the felted product to cure the melamine-aldehyde resin.

5. A method for the production of cellulosic products of improved wet strength which comprises preparing a suspension of cellulosic fibers containing from 0.1% to about 10% by weight of said fibers in water containing from 40 to 150 parts per million of dissolved sulfate ion, adding to said suspension a quantity of a colloidal solution of cationic melamine-formaldehyde resin containing from 5% to 10% of said resin, based on the dry weight of said cellulosic fibers, adsorbing substantial quantities of said resin on the fibers, forming the treated fibers into a felted product, and heating the felted product to cure the melamine-aldehyde resin therein.

CHARLES S. MAXWELL.
CHESTER G. LANDES.

REFERENCES CITED

The following references are of record in the file of this patent:

UNITED STATES PATENTS

| Number | Name | Date |
|---|---|---|
| 1,992,589 | Tucker | Feb. 26, 1935 |
| 2,345,543 | Wohnsiedler | Mar. 28, 1944 |
| 2,352,922 | Thomas | July 4, 1944 |
| 2,394,289 | Boughton | Feb. 5, 1946 |

FOREIGN PATENTS

| Number | Country | Date |
|---|---|---|
| 523,185 | Great Britain | July 8, 1940 |

OTHER REFERENCES

"Applied Colloid Chemistry," by Bancroft, second edition (1926), page 285.

"Paper Trade Journal," vol. 116, No. 19, May 13, 1943, pages 207–209.